United States Patent

[11] 3,563,265

| [72] | Inventor | Charles H. Graham<br>Mountain View, Calif. |
|---|---|---|
| [21] | Appl. No. | 668,074 |
| [22] | Filed | Sept. 15, 1967 |
| [45] | Patented | Feb. 16, 1971 |
| [73] | Assignee | Gra-Tec, Inc.<br>Los Altos, Calif.<br>a corporation of California<br>Continuation-in-part of application Ser. No. 617,145, Feb. 20, 1967, which is a continuation of application Ser. No. 515,848, Dec. 23, 1965, now abandoned, which is a continuation-in-part of application Ser. No. 432,598, Feb. 15, 1965, now abandoned. |

[54] BALL VALVE ASSEMBLY
19 Claims, 6 Drawing Figs.

[52] U.S. Cl. ................................................ 137/269;
251/315, 251/368
[51] Int. Cl. ............................................ F16l 29/00,
F16k 5/06

[50] Field of Search.......................................... 137/269,
271, 315; 251/88, 208, 209, 292, 314, 315, 316,
317, 362, 363, 368

[56] References Cited
UNITED STATES PATENTS

| 3,334,862 | 8/1967 | Hookway Jr. .................. | 251/208 |
|---|---|---|---|
| 3,386,699 | 6/1968 | Petter et al. .................. | 251/315 |
| 3,394,726 | 7/1968 | Brice .......................... | 137/269 |

Primary Examiner—M. Cary Nelson
Assistant Examiner—Robert J. Miller
Attorney—Limbach, Limbach & Sutton ABSTRACT: An assembly comprised of a distribution block having a plurality of outer faces with each of at least certain of the faces provided with a bore extending into the block and a ball valve member disposed within the block to provide a fluid flow path therethrough. A fitting member is provided for each bore respectively with the fitting members being of any desired configuration to permit the entire assembly to be quickly connected and disconnected in building block fashion, to form a fluid valve from any one of a number of different combinations of blocks and fitting members.

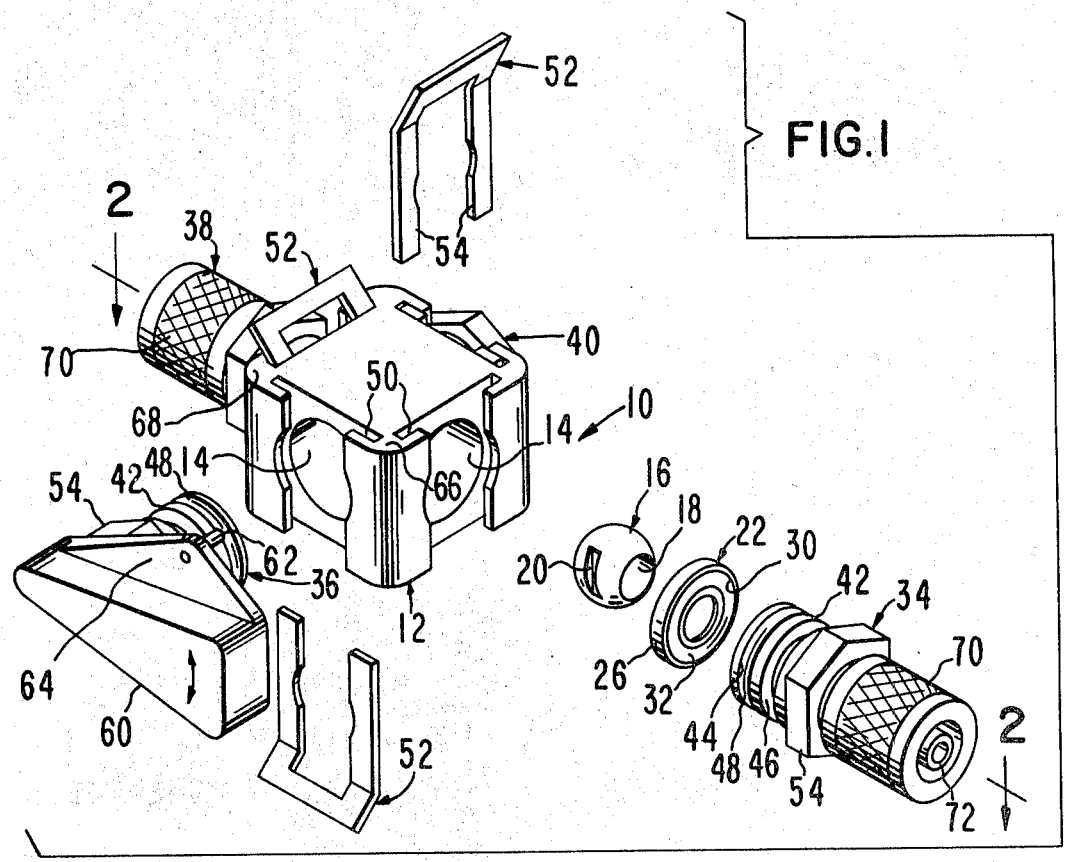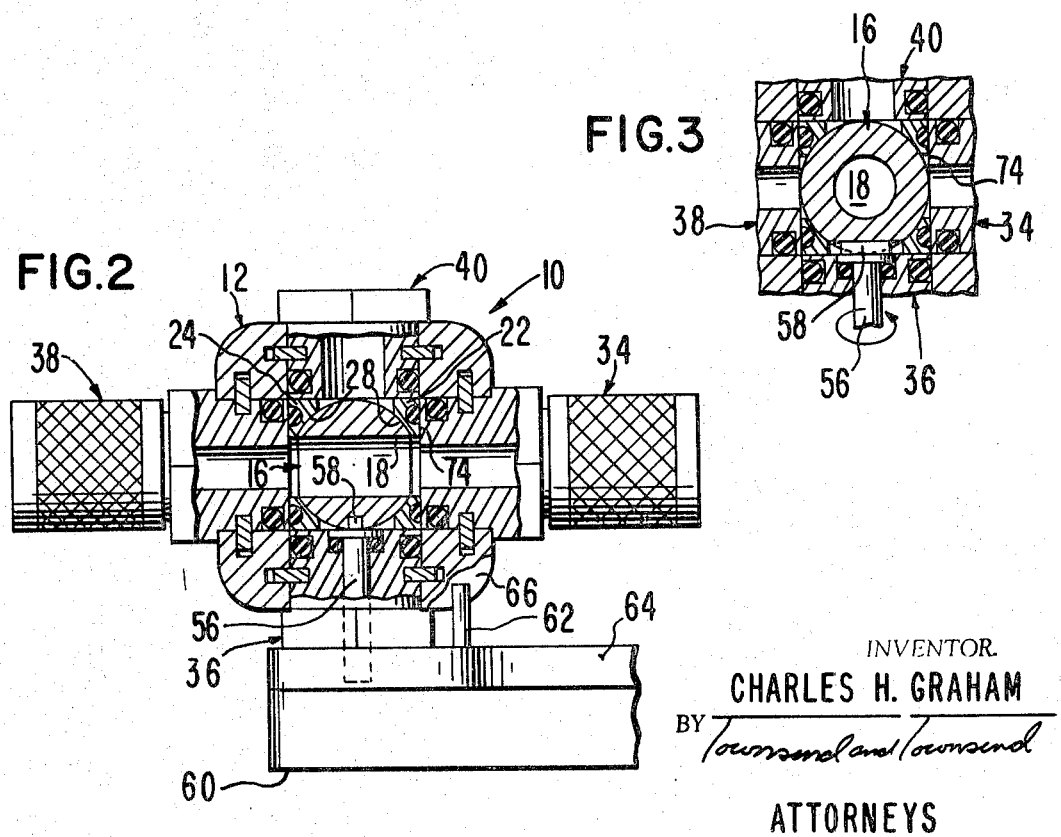
INVENTOR.
CHARLES H. GRAHAM
BY Townsend and Townsend
ATTORNEYS

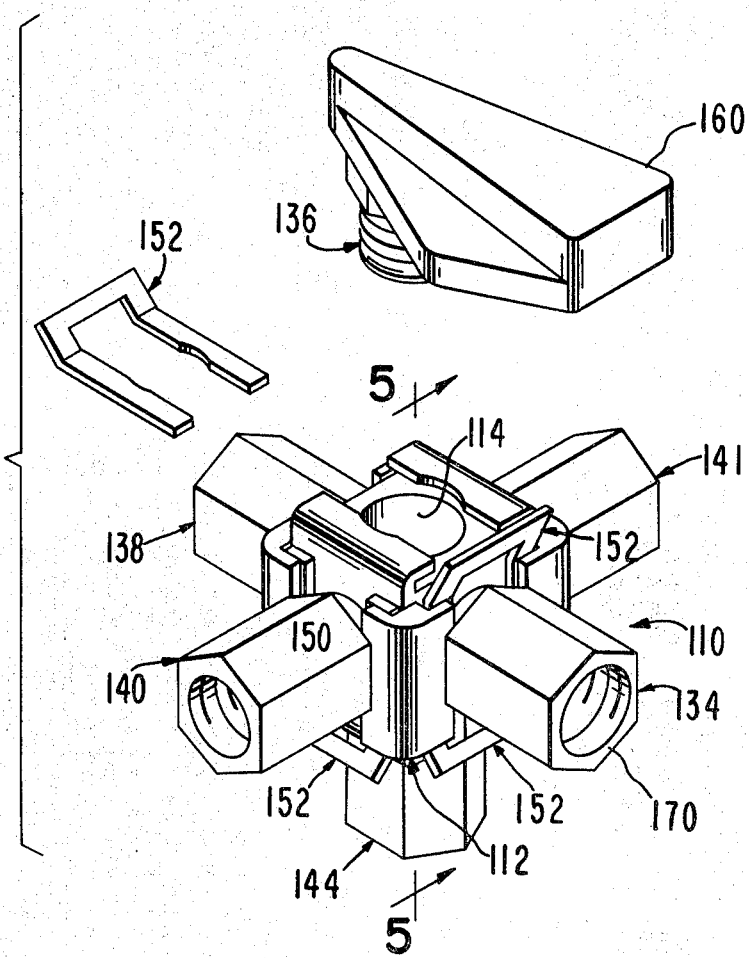
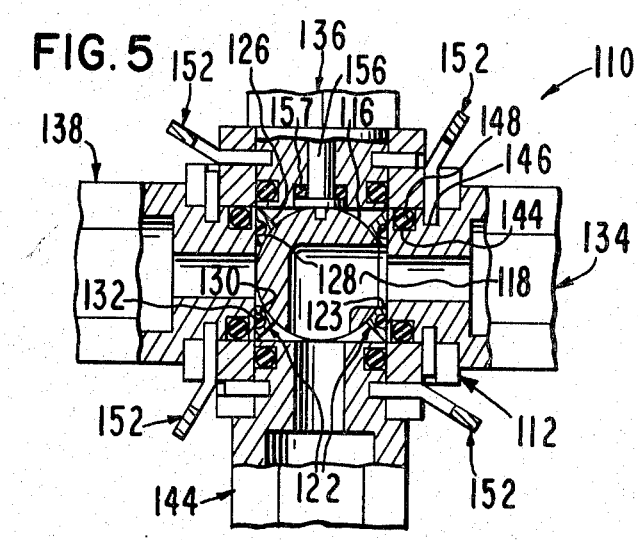
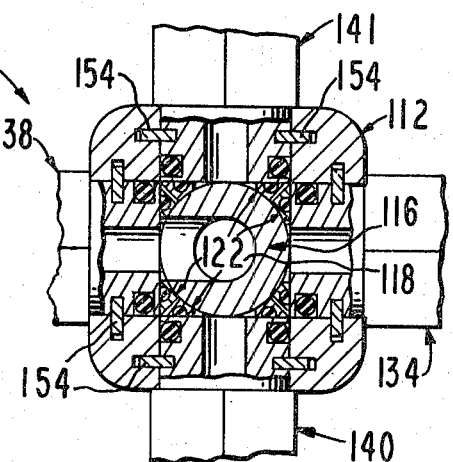
INVENTOR.
CHARLES H. GRAHAM
BY Townsend and Townsend
ATTORNEYS

BALL VALVE ASSEMBLY

This application is a continuation-in-part of my copending application, Ser. No. 617,145, filed Feb. 20, 1967, entitled COUPLING ASSEMBLY which is a continuation of application Ser. No. 515,848, filed Dec. 23, 1965, entitled COUPLING ASSEMBLY, now abandoned and which was a continuation-in-part of application Ser. No. 432,598, filed Feb. 15, 1965, entitled FLUID COUPLING ASSEMBLY, now abandoned.

This invention relates to improvements in fluid flow distribution systems and, more particularly, to a ball valve assembly formed from a number of parts in building block fashion.

The structure set forth in the above-identified copending application provides a coupling assembly for a fluid flow distribution system wherein the assembly can have any one of a number of different configurations and can be quickly and effectively produced from a standard distribution block and from a number of fitting terminations or members. By the proper choice of the fitting terminations or members, the coupling assembly itself can take on a wide variety of different configurations depending upon the use to which the same is to be put. From only a relatively few basic types of fitting members, a wide variety of configurations for the coupling assembly can be obtained. Moreover, the connecting and disconnecting of the various fitting members can be done in a minimum of time and with a minimum expenditure of effort. Thus, the coupling assembly can be constructed in building block fashion to suit the requirements of a particular application.

The coupling assembly of the above-mentioned disclosure has a number of advantages over prior structures. For instance, the coupling assembly can be assembled and disassembled in a matter of seconds. Furthermore, the fitting members are not threadably coupled to the distribution block. This allows the block and fitting members to rotate relative to each other to thereby avoid strains on the parts and having to compensate for such movement as is required with threaded joints. Still a further advantage is that, since no threading or rotating of the parts is required to connect the same, the parts can be put together in a closely packed array to thereby conserve space and permit the parts to be initially layed out in a pattern to assure that all parts are present and can fit into a given space before the parts are coupled together.

The coupling assembly of the present invention not only provides for the advantages of the structure of the aforesaid disclosure but also provides an improvement over such structure in that it permits a shiftable ball valve member to be received interiorly of a standard distribution block with a fitting member to control the shifting of the valve member, whereby the coupling assembly forms a valve unit of the ball valve type. Fitting terminations or members of standard construction are utilized with the valve unit so that the building block features of the above-mentioned disclosure can be utilized to permit the present invention to be arranged in any desired fluid valve configuration.

An important feature of the present invention is the way in which the ball valve is mounted for rotation in the distribution block. To this end, bearing structure in the form of bearing elements of ringlike construction are disposed in respective bores of the distribution block on opposed sides of the valve member and allow the valve member to rotate freely relative to the block. Means extending through one of the bores is coupled to the valve member to effect selective rotation of the latter so as to align the fluid passage therethrough with at least a pair of fitting members in other bores when the valve member is in a first operative position. Thus, a fluid flow path is established between the fluid passage through the valve member and the fitting members aligned therewith.

A further important feature is the use of the bearing elements to provide a seal for the fluid flow path along the outer surface of the ball valve member itself. This seal is effected by the provision of structure at the outer face of each bearing element for engaging an adjacent fitting member, so that an inwardly directed force is exerted on each bearing element to cause the same to be forced against the outer surface of the valve member to thereby assure the proper seal against leakage along the outer surface of the valve member.

Still a further important feature of the present invention is the use of a fitting member for effecting the rotation of the ball valve member relative to the distribution block. To this end, one of the fitting members is provided with a shaft rotatably mounted thereon with the shaft having a transverse projection on the inner end thereof receivable within a groove in the outer surface of the valve member whereby rotation of the shaft relative to its fitting member will cause the valve member to rotate within the block. Thus, the fluid passage in the valve member will move into and out of alignment of at least a pair of bores in the housing. Fluid flow through the distribution block will thereby be effectively controlled by the proper positioning of the valve member with respect to the fitting members defining the path of flow through the block.

The primary object of this invention is, therefore, to provide a coupling assembly of improved construction wherein a ball valve member is disposed within a distribution block so that the coupling assembly itself will operate as a valve and various fitting members can be quickly and easily coupled to the distribution block notwithstanding the presence of the ball valve member therein to thereby assure that the coupling assembly can be assembled and disassembled in building block fashion.

Another object of the present invention is to provide a coupling assembly of the type described wherein the ball valve member is rotatably mounted within the distribution block by bearing structure of improved construction with the bearing structure being on opposed sides of the ball valve member and in alignment with a pair of bores extending into the block whereby the fluid passage through the valve member will allow a fluid flow path through the pair of bores to be established and the bearing structure provides a seal for the outer surface of the ball valve member for all operative positions of the latter.

A further object of the present invention is to provide a coupling assembly of the aforesaid character wherein the bearing structure includes a pair of bearing elements removably carried within the distribution block and are forced against the valve member when the fitting members are coupled to the distribution block so that the bearing elements themselves serve not only to mount the ball valve member for rotation but also serve to seal the same against leakage along the outer surface of the valve member for all operative positions of the same.

Still another object of the present invention is to provide a fluid valve of the ball valve type for use in a fluid flow system wherein the valve utilizes a distribution block of standard construction and has a number of fitting members coupled to the bores thereof with the fitting members being selected from a wide variety of types and configurations so that the valve itself can be constructed in building block fashion to provide a wide variety of assembly configurations from a relatively few basic components.

One embodiment of the invention utilizes a standard distribution block having a number of side faces and a pair of end faces with only the side faces having bores extending into the block. This embodiment permits a simple valve structure to be formed with the ball valve member having a fluid passage extending diametrically therethrough.

A second embodiment of the invention utilizes a distribution block slightly modified from a block generally considered of standard construction in that the second embodiment has bores extending into both the side and end faces of the block. Thus, a more complicated valve structure can be formed, such as one whose ball valve member has an L-shaped or T-shaped fluid passage therethrough.

Other objects of this invention will become apparent as the following specification progresses, reference being had to the accompanying drawings for an illustration of several embodiments of the invention.

In the drawings:

FIG. 1 is an exploded, perspective view of one embodiment of the coupling assembly of the present invention;

FIG. 2 is a cross-sectional view of the coupling assembly with the parts thereof in an assembled form and with the ball valve member thereof in a first operative position;

FIG. 3 is a view similar to FIG. 2 but shown the valve member in a second operative position;

FIG. 4 is an exploded perspective view of a second embodiment of the invention;

FIG. 5 is a cross-sectional view of the valve taken along line 5–5 of FIG. 4 and showing the ball valve member therewithin in a first operative position; and FIG. 6 is a cross-sectional view through the coupling assembly of FIGS. 4 and 5 with the valve member in a second operative position and looking in a direction at right angles to the view shown in FIG. 5.

A first embodiment of the coupling assembly, broadly denoted by the numeral 10 and shown in FIGS. 1–3, includes a standard distribution block 12 having a plurality of outer faces. For purposes of illustration block 12 has the configuration of a right rectangular parallelepiped with a square transverse cross section and each of its four sides has a smooth, cylindrical bore 14 extending into the block with the bores terminating at a central location within the block and communicating with each other.

A ball valve member 16 is movable into the block through any one of the bores and is normally disposed in the central location common to all of the bores. Valve member 16 has a fluid passage 18 extending diametrically therethrough and is provided with a recess 20 formed as a slot in the outer surface thereof with the bottom of the slot along a sector of a great circle substantially midway between the ends of passage 18.

Valve member 16 is rotatably mounted between a pair of bearing elements 22 and 24 of the type shown in FIG. 1 wherein each element has a cylindrical outer surface 26, an inner face 28, and an outer face provided with a groove 30 into which is disposed a resilient O-ring 32. The bearing elements are received within block 12 through opposed bores 14 and the bearing elements normally are positioned at the inner extremities of respective bores 14 in the manner shown in FIGS. 2 and 3. Inner faces 28 of the bearing elements are beveled or concave to provide surfaces against which valve member 16 complementally seats. Thus, valve member is rotatable with respect to the bearing elements about an axis substantially perpendicular to fluid passage 18. The axis of rotation of valve member 16 also extends through the bore 14 which is perpendicular to the bores having bearing elements 22 and 24 therein.

The block is provided with fitting members or terminations in the various bores 14 to complete the coupling assembly. Such fitting members are denoted by the numerals 34, 36, 38 and 40. Fitting member 36 differs from the other fitting members in that it has means receivable within recess 20 for rotating valve member 16 within block 12.

Each fitting member has a cylindrical extension 42 receivable within a bore 14 and each extension has a pair of annular grooves 44 and 46 in the outer surface thereof. Groove 44 is adjacent to the normally innermost end of its extension 42 and has a resilient O-ring 48 for engaging the smooth inner surface of the corresponding bore to seal the junction between its extension 42 and block 12 in the manner shown in FIGS. 2 and 3.

Groove 46 is alignable with a T-shaped slot 50 in block 12 with the top of the T extending transverse to the bore 14 adjacent to the outer end thereof there being a slot 50 for each bore 14 respectively. Spring clips 52, each having spaced, generally parallel legs 54, can be moved into the top portion of the slots with the legs 54 thereof being received within grooves 46 at opposite sides of corresponding extensions 42. Thus, the fitting member will be releasably locked to the block with the corresponding O-ring 48 in sealing relationship to the inner cylindrical surface defining corresponding bore 14. Shoulder structure 54 limits the movement of each extension 42 and assures alignment of the corresponding groove 46 with a slot 50.

Fitting member 36 has a central shaft 56 rotatably mounted within its extension 42. A resilient O-ring is disposed within a recess adjacent to the innermost end of member 36 (FIGS. 2 and 3) and seals against fluid leakage along the outer surface of shaft 56. The inner end of the shaft has an elongated transverse projection 58 which is complementally receivable within recess 20 of valve member 16 (FIG. 3) when the corresponding extension 42 is received within the bore aligned with recess 20. A handle 60 secured in any suitable manner to the outer end of the shaft permits manual rotation of the same relative to extension 42 wherein the valve member is caused to rotate relative to block 12. Handle 60 has a stop 62 on a laterally extending web 64 thereof. Stop 62 is positioned so that it is engageable with a pair of corners 66 and 68 (FIGS. 1 and 2) of block 12 to limit the arc through which shaft 56 is rotated to substantially 90°. Thus, when fluid passage 18 is initially aligned with the fluid passages through fitting members 34 and 38, stop 62 will engage corner 66 and the valve defined by assembly 10 will be open. Rotation of handle 60 until stop 62 engages corner 68 will cause passage 18 to be moved to a position extending perpendicular to the passages of fitting members 34 and 38 (FIG. 3) and the valve will be closed.

The fitting members other than fitting member 36 may be of any desired configuration and various fitting members are interchangeable in bores 14 whereby coupling assembly 10 may have any one of a wide variety of configurations so that it can be adapted for any one of a number of different fluid flow applications. For purposes of illustration only, fitting members 34 and 38 have an outer threaded sleeve 70 in surrounding relationship to a tapered tubular tip 72 by means of which other components such as conduits, can be connected to block 12. Fitting member 40 is shown as a plug or closure for the bore opposite to the bore having fitting member 36. Since no fluid flow will occur through the bore having fitting member 40 so long as fluid passage 18 extends diametrically through the valve member, no fitting member other than member 40 is required.

In all cases, the fitting members are quickly and easily connected and disconnected from the block. Each fitting member is releasably held in its operative position by a clip 52 whose legs 54 extend into the respective slot 50 in the manner shown in FIGS. 1 and 2.

An important aspect of assembly 10 is the seal provided by bearing elements 22 to prevent fluid leakage along the outer surface of ball valve member 16. To this end, each extension 42 of fitting members 34 and 38 has a generally flat innermost face 74 (FIGS. 2 and 3) which engages the adjacent O-ring 32 in the corresponding bearing elements. Each O-ring 32 normally projects outwardly a short distance from the corresponding bearing element; thus, the O-ring is compressed when it is engaged by an extension 42 and, since the O-ring is snugly fitted in its groove 30, the compression force exerted on the O-ring is, in turn, transmitted to the bearing element body. Inner face 28 of the bearing element is, therefore, forced against the valve member in sealing relationship thereto. The valve member, however, is capable of rotating relative to such inner faces 28 notwithstanding the seal provided by the bearing elements and O-rings 32 provide a degree of resiliency which aids in ease of rotation of the valve member.

Each bearing element 22 is of a material suitable to permit rotation of the valve member relative to the bearing elements without causing any substantial wear on either the bearing element or the valve member itself. Teflon has been found to be a suitable material for this purpose not only because of its long operating life but also because its inherent resilience which allow the bearing element to conform to the outer surface of the valve member. Other materials, such as Kynar or Buna, can be used for this purpose, if desired.

In use, the configurations and sizes of the block and the fitting members of coupling assembly 10 are first selected to provide a valve having specific fluid flow characteristics. With such components at hand, assembly of the same is begun by placing one of the bearing elements 22 into the block, following which the valve member is inserted and the other bearing element 22 is put into place. The valve member is mounted for rotation about an axis through the bore which is to receive fitting member 36.

The fitting members are then inserted into the respective bores and locked to the block by slips 52. Fitting member 36 will be inserted so that projection 58 is received within recess 20. The assembly of the components is now complete and fitting members 34 and 38 may then be connected to a pair of conduits for placing assembly 10 in a fluid flow line.

The assembly time for constructing assembly 10 is of the order of 15 to 20 seconds after all of the parts have been selected and are ready to be put together. Not only are the bores sealed when the fitting members are put into their proper positions, but also the valve member itself is sealed against leakage along its outer surface by bearing elements 22.

Control of fluid flow through assembly 10 is effected by manipulation of handle 60. Stop 62 is movable between corners 66 and 68 at which locations the valve member is in a fully open condition and a fully closed condition respectively.

Assembly 10 is used where a one-way action for the ball valve is desired. For this situation, fitting member 36 can be used in a block whose bores extend inwardly form its sides only, as shown in FIG. 1, rather than from both its sides and its end faces as shown in FIG. 4.

It may be desirable to construct a ball valve assembly having a fluid passage therethrough different from the diametrical fluid passage 18 of assembly 10. For instance, it may be desirable to have a valve whose fluid passage through the ball valve member is L-shaped or T-shaped. For these cases, the coupling assembly shown in FIGS. 4—6 is utilized. This assembly is denoted by the numeral 110 and has essentially the same components as coupling assembly 10 except that the distribution block 112 has bores extending thereinto not only from its sides but also from its end faces as shown in FIG. 4.

To this end, distribution block 112 has a bore 114 for each of sides and its end faces respectively, with the bores terminating at a central location within the block whereby a ball valve member 116 having a fluid passage 118 therethrough can be mounted for rotation about the axis of one of the bores. For purposes of illustration only, this axis is through the bore extending inwardly from one end face of the block as shown in FIG. 4.

A plurality of fitting members 134, 136, 138, 140, 141 and 144 are releasably coupled to block 112 and each has an extension 142 provided with spaced grooves 114 and 146 in the outer surface thereof. A resilient O-ring 148 is received within each groove 144 for sealing the corresponding bore, and each groove 146 is alignable with a respective T-shaped slot 150 at the corresponding face of block 112. A spring clip 152 having legs 154 extends through each slot 146 and into a groove 146 to lock the corresponding fitting member to the block. In this way, each fitting member is releasably locked to block 112 with its O-ring 148 in sealing relationship to the inner surface defining the corresponding bore 114.

For rotatably mounting valve member 116 in block 112, four bearing elements 112 are provided, two of such elements being on one pair of opposed sides of the valve member and the other two bearing elements being on a second pair of opposed sides. The first pair of bearing elements are received within bores 114 corresponding to fitting members 134 and 138 and the second pair of bearing elements are received within bores corresponding to fitting elements 140 and 141.

Each bearing element 112 is ringlike in construction in that it has a central opening 123, a conical side face 126, an inner face 128 complementally engageable with valve member 116, and an outer face having a groove 130 therein for snugly receiving a resilient O-ring 132 (FIG. 5). As in assembly 10, the fitting members engage respective O-rings 132 for compressing the same to cause the inner faces 128 to be forced tightly into sealing engagement with the outer surface of ball valve member 116. The resulting seal causes the valve member to be sealed against leakage along its outer surface as well as to permit rotation of the valve member relative to block 112. The material forming each bearing element 122 is preferably resilient to allow the corresponding inner face 128 to conform to the outer surface of valve member 116. Teflon is especially adapted for this purpose.

Fitting member 136 has a central shaft 156 journaled therein and the bore for the shaft is sealed by a resilient O-ring 159 (FIG. 5). Shaft 156 has a transverse projection 158 on its inner end for insertion into a circumferentially extending recess in the outer surface of the valve member 116. A handle 160 is coupled to the outer end of shaft 156 and is manually rotatable to cause rotation of the shaft and thereby the valve member.

In use, the various components of assembly 110 are grouped together at one location with the fitting members being selected as to configuration and size to accomplish a particular fluid flow distribution purpose. For purposes of illustration only, each fitting member shown in FIGS. 4 and 5 has an outer sleeve 170 for coupling block 112 to a respective fluid conduit. One of the fitting members can be of the plug or closure type while the other fitting members have the configurations shown in FIGS. 4 and 5.

The various components are assembled by first inserting at least a pair of adjacent bearing elements 122 within block 112, following which valve member 116 is inserted through one of the bores and into the central location of the block.

As soon as all four of the bearing elements are inserted, the various fitting members are coupled to the block by inserting them into respective bores. It will be clear that the valve member will be initially located so that its fluid passage 118 will be alignable with the desired fitting members. Also, fitting member 136 is inserted so that projection 158 enters the recess in the outer surface of valve member 116. As soon as all of the fitting members are in place, they are locked to the block by the various clips 152 which are inserted into respective slots 150. When the aforesaid assembly has been completed, coupling assembly 110 is ready to be connected in a fluid flow line and can be used immediately since all of the junctions of the various parts are completely sealed and no further steps are required to place assembly 110 in condition for immediate use.

The various fitting members are interchangeably received within bores 114 so that assembly 110 can take on any configuration depending upon the desired application to which the same is to be put. Also, the fitting members can have configurations other than those shown to adapt assembly 110 to a variety of uses by the provision of only a relatively few basic components.

The assembly and disassembly times for assembly 110 is relatively short and the change from one configuration to another is a relatively simple operation which involves no special skills on the part of the user. Such a change merely requires that the proper fitting or termination members be selected for the particular application of the assembly itself and then inserted in the block at the desired locations.

The present invention therefore provides a relatively simple ball valve structure which can be constructed in a minimum of time in building block fashion from a relatively small number of parts which can have any one of a wide variety of configurations and sizes to meet a particular need or application.

An important feature of the construction of assemblies 10 and 110 lies in the fact that the bearing elements thereof are disposed to absorb the thrust due to fluid pressure in the fluid flow line of which each assembly may form a part. Thus, the valve member of each assembly will thereby remain properly mounted in the block at all times.

I claim:

1. In a coupling assembly for a fluid flow system: a distribution block having a plurality of outer faces and a bore for each of at least certain of said faces, the bores being of the same diameter and extending into said block from respective faces and being interconnected to form a space within the block; a ball valve member removably receivable within said space through any of said bores and having a fluid passage therethrough; means mounting said valve member within said space for rotation relative to the block about an axis extending through the valve member; means extending into one of the bores and coupled with said valve member for rotating the latter from one position with the fluid passage in alignment with a pair of bores to a second position with said passage out of said alignment; and a fitting member for each of the remaining bores respectively, said block having a slot for each bore respectively, each slot extending transversely of the respective bore, the fitting members having extensions removably receivable within respective bores, each extension having means sealingly engaging the inner surface defining a bore and provided with groove structure aligned with the corresponding slot when the extension is received within the bore, whereby a locking clip can be moved in the slot and into the groove structure of each extension to releasably lock the corresponding fitting member to the block.

2. In a coupling assembly for a fluid flow system: a distribution block having a plurality of outer faces and a bore each of at least certain of said faces respectively, the bores extending into the block from respective faces and terminating at a space interiorly of the block, there being a slot for each bore respectively, each slot extending parallel to respective faces and adapted to mount a locking slip therein; a fitting member for each bore respectively, the fitting members being interchangeably receivable within the bores, each fitting member having means thereon for sealingly engaging the inner surface defining a bore and provided with groove structure aligned with the corresponding slot when the fitting member is received within the bore to permit a clip mounted in the slot to releasably lock the fitting member to the block; a ball valve member having a fluid passage therethrough; means mounting the valve member within said space for rotation relative to the housing about the axis of one of the bores to permit the valve member to move from a first position with said fluid passage in alignment with a pair of other bores to a second position with the fluid passage out of said alignment, the pair of fitting members receivable within said pair of bores being tubular, whereby a fluid flow path is established through said pair of fitting members when said valve member is in said first position, said mounting means sealing the junctions between said valve member and said pair of fitting members when the latter are locked to said block, the fitting member received in said one bore being rotatable relative to said housing and having means releasably connected to said valve member for rotating the same from said first position to said second position and return.

3. In a coupling assembly for a fluid flow system: a distribution block having a plurality of outer faces and a bore for each of at least certain of said faces respectively, the bores extending into the block and intersecting each other interiorly of the block, each bore having a slot extending transversely thereof and parallel to the respective face; a fitting member for each bore respectively, the fitting members being interchangeably receivable within said bores, each fitting member having an extension provided with a seal for engaging the inner surface of a bore when the extension is in an operative location therewithin, said extension having groove structure aligned with the slot of the bore when the extension is in said operative location whereby a locking clip mounted in the slot can be shifted into locking relationship to the corresponding fitting member; a ball valve member having a fluid passage therethrough; means mounting said valve member at the intersection of said bores for rotation about an axis through one of the bores, the fitting member in said one bore having means releasably coupled to the valve member for rotating the same about said axis from a first position with said passage in alignment with a pair of tubular fitting members in a pair of other bores to a second position with said passage out of said alignment, whereby a fluid flow path will be established by said pair of fitting members and said passage when said valve member is said first position, said mounting means being disposed to seal said valve member at locations to confine a fluid flow only to said fluid flow path.

4. In a coupling assembly as set forth in claim 3, wherein is provided a locking clip for each fitting member respectively said clips being mounted in corresponding slots and movable relative to the block into and out of the groove structures of respective fitting members to permit the latter to be releasably locked to the block.

5. In a coupling assembly as set forth in claim 3, wherein said rotating means includes a shaft journaled on the fitting member in said one bore, said valve member having a recess therein, said shaft extending into said recess and being disposed to rotate the valve member when the shaft is rotated relative to its fitting member.

6. In a coupling assembly as set forth in claim 5, wherein said recess extends transversely of said axis, said shaft having a projection on the normally innermost end thereof, said projection being substantially complemental to and extending along at least a portion of said recess.

7. In a coupling assembly as set forth in claim 3, wherein said mounting means includes at least a pair of bearing elements, each element having an inner face substantially complemental to and normally engaging the outer surface of said valve member.

8. In a coupling assembly as set forth in claim 7, wherein said bearing elements are removably positioned within said block on opposed sides of the valve member.

9. In a coupling assembly as set forth in claim 7, wherein each bearing element has a central opening therethrough and an outer face provided with a seal in surrounding relationship to the opening, the latter being aligned with a respective bore, said seal being in engagement with the extension received within the respective bore when the extension is in its operative location.

10. In a coupling assembly as set forth in claim 9, wherein said seal is resilient, the extension in the bore aligned with the opening corresponding to the seal being disposed to compress the seal to cause the latter to urge the corresponding bearing element against the valve member.

11. In a coupling assembly for a fluid flow system: a distribution block having a plurality of faces and a bore for each of at least certain of said faces respectively, the bores extending into the block from respective faces and intersecting each other at a central location within the block, a pair of said bores being in axial alignment with each other; a ball valve member at said location and having a fluid passage therethrough; a pair of bearing elements disposed within respective bores of said pair and normally engaging said valve member at a pair of opposed sides thereof for mounting the valve member for rotation about an axis extending through a third bore; a pair of fitting members removably received within respective bores of said pair; a third fitting member removably received within said third bore and having structure rotatable relative to the block about said axis; means for each fitting member respectively for releasably holding the same in an operative position within the respective bore, the fitting members of said pair being in sealing engagement to respective bearing elements when the pair of fitting members are in their operative positions; and means releasably coupling said structure to the valve member to cause the latter to be rotated about said axis as the structure is rotated relative to said block.

12. In a coupling assembly as set forth in claim 11, wherein said pair of fitting members are tubular, each bearing element having a central opening therethrough, said fluid passage being aligned with said tubular fitting members when the valve member is in a first operative disposition.

13. In a coupling assembly as set forth in claim 11, wherein said fluid passage extends diametrically through the valve member, said block having a number of side faces and a pair of end faces, the bores being provided only for said side faces.

14. In a coupling assembly as set forth in claim 11, wherein is included a second pair of bearing elements within a second pair of bores and normally engaging the valve member at a second pair of opposed sides thereof, there being a second pair of fitting members for respective bores of said second pair, means coupled to each fitting member of the second pair respectively for releasably holding the same in an operative position within the respective bore, the fitting members of said second pair being in sealing engagement to respective bearing elements when the last-mentioned fitting members are in their operative positions.

15. In a coupling assembly as set forth in claim 14, wherein said block is provided with a number of side faces and a pair of end faces, the bores being provided for said side and end faces.

16. In a coupling assembly as set forth in claim 11, wherein each bearing element is formed from a resilient material and has a central opening, an inner face, and an outer face with the inner and outer faces surrounding said opening, the inner face being substantially complemental to said valve member and the outer face having a groove provided with a resilient O-ring therein for engaging the inner end of the corresponding fitting member.

17. In a coupling assembly as set forth in claim 16, wherein said material is Teflon.

18. In a coupling assembly as set forth in claim 11, wherein each bearing element has a cylindrical outer surface complemental to the respective bore.

19. In a coupling assembly as set forth in claim 11, wherein is provided a second pair of bearing elements for a second pair of bores, each of said bearing elements having an inner face, an outer face, and a beveled side face extending between the inner and outer faces.